United States Patent
Gerard (10) Patent No.: US 12,479,335 B2
(45) Date of Patent: Nov. 25, 2025

(54) DEVICE FOR POWERING AN ELECTRIC MOTOR OF A MOTOR VEHICLE

(71) Applicant: RENAULT S.A.S, Boulogne Billancourt (FR)

(72) Inventor: David Gerard, Guyancourt (FR)

(73) Assignee: AMPERE S.A.S., Boulogne-Billancourt (FR)

( * ) Notice: Subject to any disclaimer, the term of this patent is extended or adjusted under 35 U.S.C. 154(b) by 246 days.

(21) Appl. No.: 18/253,473

(22) PCT Filed: Nov. 22, 2021

(86) PCT No.: PCT/EP2021/082411
§ 371 (c)(1),
(2) Date: May 18, 2023

(87) PCT Pub. No.: WO2022/112145
PCT Pub. Date: Jun. 2, 2022

(65) Prior Publication Data
US 2024/0001808 A1    Jan. 4, 2024

(30) Foreign Application Priority Data
Nov. 25, 2020 (FR) ...................... 2012152

(51) Int. Cl.
*B60L 58/40* (2019.01)
*B60L 50/75* (2019.01)
*B60L 58/33* (2019.01)

(52) U.S. Cl.
CPC ............... *B60L 58/40* (2019.02); *B60L 50/75* (2019.02); *B60L 58/33* (2019.02); *B60L 2240/545* (2013.01)

(58) Field of Classification Search
CPC .......... B60L 58/40; B60L 50/75; B60L 58/33; B60L 2240/545; Y02T 10/70; Y02T 90/40
See application file for complete search history.

(56) References Cited

U.S. PATENT DOCUMENTS

| 2007/0126404 A1* | 6/2007 | Iida ................... B60L 58/21 320/136 |
| 2009/0058329 A1* | 3/2009 | Ichikawa ............. B60L 58/20 307/82 |

(Continued)

FOREIGN PATENT DOCUMENTS

| FR | 3055116 A1 * | 2/2018 | ............ B60L 3/0046 |
| WO | WO 2007/123222 A1 | 11/2007 | |

OTHER PUBLICATIONS

International Search Report issued Mar. 9, 2022 in PCT/EP2021/082411, filed on Nov. 22, 2021, 2 pages.

(Continued)

*Primary Examiner* — Isaac G Smith
*Assistant Examiner* — Nikki Marie M Molina
(74) *Attorney, Agent, or Firm* — Oblon, McClelland, Maier & Neustadt, L.L.P.

(57) ABSTRACT

An electric power supply device includes a first energy source having at least one battery and a second energy source having at least one fuel cell. The first and second energy sources supply energy to an electric motor of a motor vehicle in different proportions. A control module of the electric power supply device includes a memory that stores a value of a maximum operating power able to be supplied by the second energy source so that the second energy source is not asked to supply an amount greater than the stored maximum operating power. The maximum operating (Continued)

power value of the second energy source is dependent on a cooling capacity for the second energy source.

10 Claims, 3 Drawing Sheets

(56) References Cited

U.S. PATENT DOCUMENTS

2012/0041627 A1* 2/2012 Kelty ................ B60L 15/2045
  701/22
2014/0342260 A1* 11/2014 Koyama ................ F16D 61/00
  429/439

OTHER PUBLICATIONS

French Preliminary Search Report Issued Jul. 22, 2021 in French Application 20 12152 filed on Nov. 25, 2020 (with English Translation of Categories of Cited Documents), 3 pages.

* cited by examiner fig 1 fig 2 fig 3 fig 4

DEVICE FOR POWERING AN ELECTRIC MOTOR OF A MOTOR VEHICLE

BACKGROUND

The present invention relates to the field of electric or hybrid motor vehicles. The invention relates more particularly to power supply devices intended to supply an appropriate electric power to the motor of these motor vehicles.

In electric or hybrid vehicles, the electric motor receives the electric power needed for it to operate in particular from a main battery.

One of the issues in the development of electric vehicles is the travel range of the vehicle. One solution contemplated to extend this range is to associate an additional energy source with the main battery, and it is in particular contemplated to associate a fuel cell system with the main battery. The electric motor may thus be supplied with power first and foremost by the main battery and, if necessary, by the fuel cell, when the charge of the main battery is insufficient to continue to do so, in order to increase the range of the vehicle when the battery is completely discharged.

It may therefore be considered that the fuel cell and the main battery are arranged in parallel with one another to allow separate electric power supplies to the electric motor depending on the use case, the electric motor being able to be supplied with power simultaneously by the first energy source formed by the main battery and by the second energy source formed by the fuel cell system.

In such a configuration, in which the fuel cell system should be considered as a range extender of the main battery, the fuel cell may therefore supply power directly to the electric motor, by supplementing the main battery, and may also, if necessary, contribute to recharging the battery while the vehicle is in motion.

Another use of the fuel cell system is described in particular in document DE102015011274, relating to the heating of the passenger compartment. This document refers to fuel cell control that is specific in that it may be modified on the basis of the detection of an outside temperature. More particularly, when the detected temperature is lower than a given value, the portion of the electric power supplied by the fuel cell is increased, in particular so as to be capable of responding to the heating demands of the passenger compartment.

Indeed, in all cases, and in particular in the abovementioned cases in which the fuel cell system forms a range extender and is able to be used to supply electrical energy to the motor of the vehicle, the production of electrical energy by the fuel cell is accompanied by a significant increase in temperature thereof. Within the fuel cell system, the fuel cell is thus associated with a cooling system that is specific thereto and that aims to evacuate calories through an exchange with outside air, via a heat exchanger arranged on the front face of the vehicle, for example. In order to ensure the correct operation of the fuel cell regardless of the conditions in which the vehicle is traveling and in particular regardless of the temperatures of the outside air, manufacturers may be forced to oversize the heat exchanger in order to ensure that there are no problems with cooling the fuel cell, in particular when outside temperatures are high.

BRIEF SUMMARY

The present invention falls within this context of fuel cell systems used as a range extender and the problem of cooling these systems, and it proposes an electric power supply device for an electric motor of a motor vehicle, comprising at least one first energy source, at least one second energy source, and a control module for controlling the first energy source so as to supply a first electric power, on the one hand, and the second energy source so as to supply a second electric power, on the other hand.

According to the invention, the electric power supply device is characterized in that the control module comprises a memory module storing a value of a maximum operating power able to be supplied by the second energy source, this maximum operating power value being dependent on the cooling capacity for the second energy source.

The power supply device that is the subject of the invention falls within the context of the use of a second energy source that makes it possible to form a range extender, namely that this second source, and for example a fuel cell generator, is housed on board the electric vehicle, being intended to increase the range thereof by ensuring the recharging of the first source and/or by supplying power directly to the electric motor.

The power supply device according to the invention is special in that it makes it possible to ensure that the use of the second energy source, as a range extender, takes place under conditions that do not risk leading to overheating of this second energy source, without however needing to oversize a cooling system associated with this second source.

According to another feature of the invention, the power supply device is characterized in that the control module is configured to:
  compare the value of the second electric power with the value of the maximum operating power able to be supplied by the second energy source,
  modify, when the second electric power exceeds the maximum operating power able to be supplied by the second energy source, the controlling of the second source so as to reduce the value of the second electric power to a value substantially equal to that of the maximum operating power able to be supplied by the second energy source, and
  accordingly modify the controlling of the first source so as to increase the first electric power supplied by the first energy source.

According to one optional feature of the invention, the sum of the values of the first electric power and of the second electric power is equal to a target electric power intended to be supplied to the electric motor. In other words, when the electric motor is supplied with power simultaneously by the first electric source and the second electric source, these two sources together generate a constant value corresponding to all or part of the electric power supplied to the electric motor. According to the invention, the reduction in the electric power supplied by the first energy source is then accompanied by an increase in the electric power supplied by the second energy source in an equivalent proportion, such that the electric power supplied to the electric motor by the power supply device according to the invention remains at a constant value.

According to some features of the invention, taken alone or in combination:
  the first energy source comprises at least one electric battery. This battery is able to supply power directly to the electric motor of the vehicle when it is sufficiently charged. This battery may in particular be configured to be recharged by an external energy source and/or by the second energy source. The external energy source is an energy source needed to recharge the main battery and located outside the vehicle, and it may for example consist of a DC current from a supercharger or an AC current from a power outlet in a home.

the second energy source comprises at least one fuel cell. This fuel cell is able to supply power directly to the electric motor of the vehicle, alternately or at the same time as the first energy source. This fuel cell may in particular be configured to be able to recharge the first energy source. The fuel cell system comprises, in addition to the fuel cell, a hydrogen tank and an air supply system. The fuel cell system comprises a fuel cell cooling system, with in particular a heat exchanger able to exchange calories with a cooling fluid, for example air outside the vehicle.

According to one optional feature of the invention, the electric power supply device may comprise at least one temperature sensor.

The control module may be configured to compare the detected temperature with a temperature threshold value, and to modify the controlling of the energy sources when the detected temperature exceeds the threshold value. In this way, and in the context that was recalled above of a power supply device according to the invention that is special in that it makes it possible to ensure that the use of the second energy source, as a range extender, takes place under conditions that do not risk leading to overheating of this second energy source, without otherwise having to oversize a cooling system associated with this second source, the operation of the vehicle in specific environmental conditions, with high temperatures, is carried out through specific management of the electric power supply in which priority is given to using the first energy source, and more particularly the main battery, while prioritizing the operating safety of the second energy source rather than the range of the vehicle. It should however be noted that the operation of the electric power supply device, in this case where the portion of electric power generated by the second source is reduced, continues to prioritize a supply of power to the electric motor both by the first energy source and by the second energy source in order to extend the autonomy of the vehicle in spite of everything, in lesser proportions but effectively all the same.

According to another optional feature of the invention, the value of the maximum operating power able to be supplied by the second energy source is variable on the basis of the detected temperature.

The temperature detected by the temperature sensor may in particular be the temperature outside the vehicle, but it should be noted that, without departing from the scope of the invention, the invention could consider a temperature inside the vehicle, and for example close to the fuel cell system.

The invention also relates to a motor vehicle comprising an electric motor and an electric power supply device as has just been mentioned.

Another subject of the invention is a method for supplying an electric power demanded by an electric power supply device for an electric motor as has just been mentioned above, the method comprising at least a step of comparing the detected temperature with a temperature threshold value, a step of comparing the second electric power demanded from the second energy source and the maximum operating power able to be supplied by the second energy source, when the detected temperature is greater than the temperature threshold value, and a step of reducing the second electric power demanded from the second source to a value equal or substantially equal to the maximum operating power able to be supplied by the second energy source, when the second electric power demanded from the second energy source exceeds the maximum operating power able to be supplied by the second energy source.

The method may moreover comprise a step of adjusting the electric power demanded from the first energy source, such that the sum of the first electric power demanded from the first source and of the second electric power demanded from the second source remains equal to a target electric power intended to be supplied to the electric motor of the vehicle.

According to one optional feature of the method according to the invention, the electric power demanded from the second energy source remains unchanged when the electric power demanded from the second energy source is less than the maximum operating power able to be supplied by the second energy source and/or when the detected temperature is lower than the temperature threshold value.

BRIEF DESCRIPTION OF THE DRAWINGS

Other features and advantages of the invention will become more apparent from the following description, on the one hand, and from a plurality of non-limiting exemplary embodiments that are given by way of indication with reference to the appended schematic drawings, on the other hand, in which drawings.

DETAILED DESCRIPTION

It will first be noted that although the figures illustrate the invention in a detailed manner with a view to implementation thereof, they may of course serve to better define the invention where appropriate. It will also be noted that, in all the figures, elements that are similar and/or that perform the same function have been designated by the same reference numbers.

Figure 1:
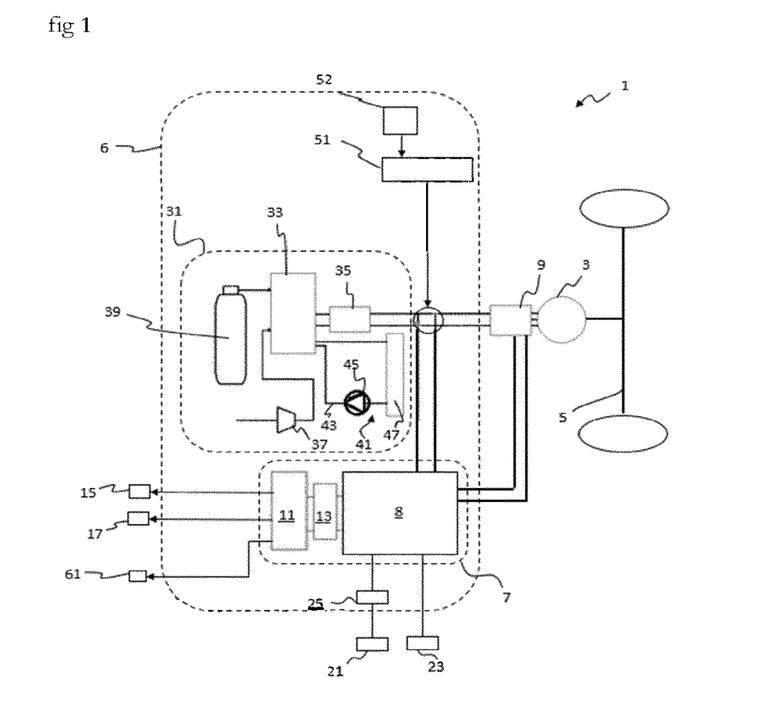
FIG. 1 is a partial schematic view of an electric vehicle equipped with an electric power supply device according to the invention, able to implement the method according to the invention.

The electric vehicle 1, illustrated schematically in FIG. 1, comprises an electric motor 3 connected to at least one set of wheels 5 of the electric vehicle 1, the connection between electric motor 3 and set(s) of wheels enabling the traction and/or propulsion of the vehicle.

The electric motor 3 is supplied with electric power via an electrical energy supply device 6. As may be seen in FIG. 1, the electric vehicle 1 thus has an architecture in which the set of wheels 5, the electric motor 3 and the power supply device 6 are arranged in series, the electrical energy produced by the power supply device 6 being used to supply power to the electric motor so that the latter has the power needed to drive the set of wheels 5. The current supplied by the electric power supply device 6 is a DC current that is converted, by a first converter 9, into an AC current suitable for the electric motor 3.

As will be detailed below, the electric power supply device 6 is special in that it comprises at least two energy sources in parallel, respectively able to supply all or part of the electric power desired for the electric motor 3. The electric power supply device 6 comprises in particular a first energy source 7, here taking at least the form of a main battery 8, which is able to supply a first electric power P1 on the basis of the control instruction given thereto, and a second energy source 31, here taking at least the form of a fuel cell 33, which is able to supply a second electric power P2 on the basis of the control instruction given thereto.

The main battery 8 is able to keep a quantity of electrical energy in reserve in order to supply the same to the electric motor 3 when the need arises. The main battery 8 is for example a lithium-ion battery.

The first energy source 7 here furthermore comprises a service battery 11 for the operation of auxiliaries 15, for example lighting devices, and/or computers 17 of the electric vehicle 1 and/or a heating device 61 for a passenger compartment of the electric vehicle 1. The service battery 11 may in particular be recharged by the main battery 8 by converting the high-voltage DC current, for example 330 V, from the main battery 8 into a low-voltage DC current, for example 14 V, using a second converter 13.

The main battery 8 may be recharged by an external energy source 21, 23. An external energy source 21, 23 may be an AC current from a power outlet in a home 21 that has to be rectified using a third converter 25 internal to the electric car 1. An external energy source 21, 23 may also be a DC current from a supercharger 23 that does not need to go through a converter.

As mentioned above, the electric power supply device 6 comprises, in parallel, the first energy source and a second energy source 31, acting as a range extender 31, capable here of recharging the main battery 8 and also of contributing to the supply of electric power to the electric motor instead of or in addition to the main battery 8.

The second energy source 31 comprises a fuel cell system 33, a compressor 37, at least one tank for a reducing fuel 39 and a cooling system 41. The fuel cell 33 is able to generate an electric power P2 through oxidation between the oxygen present in the air and delivered by the compressor 37 and the reducing fuel, for example hydrogen, contained in the tanks 39. The electric power P2 is then converted via an inverter 35 so as to be able to be directed to the electric motor. If necessary, this electric power P2 may also be used to recharge the main battery 8 of the electric vehicle 1.

The oxidation reaction that occurs in the fuel cell 33 generates calories, which are evacuated by the cooling system 41. The cooling system 41 comprises a cooling liquid that flows in a loop in a pipe 43 that transports the cooling liquid between the fuel cell system 33 and a heat exchanger 47. The flow of the refrigerant fluid in the cooling system 41 is regulated by a pump 45. The heat exchanger 47 allows the refrigerant fluid to discharge its calories through an exchange with the air outside the electric vehicle 1. It should be noted that the quantity of calories that are able to be discharged by the refrigerant fluid, and therefore the cooling capacity for the fuel cell associated with this cooling system, depends on the size of this heat exchanger and on the configuration of the area of the vehicle in which this heat exchanger is positioned. By way of non-limiting example, the cooling capacity for the fuel cell may vary depending on the surface area of the exchange area provided by the heat exchanger and/or the size of the grille on the front face of the vehicle that lets in air liable to pass through this exchange area.

The electric power supply device 6 comprises at least one control module 51 that is configured in particular to control the supply of power of each of the energy sources 7, 31 and to determine the contribution of electric power by each energy source in order to optimize the use of each source according to their range, in particular to obtain a target electric power P, that is to say the electric power needed by the electric motor 3 so that it is able to drive the set of wheels 5 in the conditions desired by the driver or the electronics of the vehicle.

In order to be able to better control the operation of each of the sources 7, 31 so as ultimately to generate this target electric power P, the control module 51 is configured to receive, or to calculate itself, an evaluation of the needs of the electric motor in terms of electric power to meet the driver's demands in terms of traction/propulsion of the vehicle, for example according to the position of the accelerator pedal.

The control module 51 associated with the power supply device according to the invention comprises a plurality of sensors, not shown here and including for example a sensor for sensing the level of charge of the main battery or a sensor for sensing the operating state of the range extender.

The control module 51 is in particular configured to take these qualitative or quantitative data into account so as to determine a distribution of the contributions of the first energy source 7 and of the second energy source 31 for generating the target electric power P.

In a first operating configuration, the control module, for example if the main battery 8 is fully charged and without this limiting the invention, controls the first energy source 7 and the second energy source 31 such that the main battery 8 generates all of the target electric power P.

In a second operating configuration, the control module, for example if the main battery 8 is discharged and without this limiting the invention, controls the first energy source 7 and the second energy source 31 such that the fuel cell 33 generates all of the target electric power P.

In a third operating configuration, the control module controls the first energy source 7 and the second energy source 31 such that each of the sources contributes, in line with a distribution defined by the control module 51, to generating the target electric power.

In other words, regardless of the operating configuration implemented by the control module, the sum of the values of the first electric power P1, that is to say the electric power generated by the first electrical source 7 of the power supply device 6, and of the second electric power P2, that is to say the electric power generated by the second electrical source 31 of the power supply device 6, is equal to the value of the target electric power P intended to be supplied to the electric motor 3.

According to the invention, a maximum operating electric power of the second energy source, otherwise called maximum operating power $P_{max}$ in the remainder of the description, is loaded into the memory of the control module 51. This maximum operating power $P_{max}$ depends on the cooling capacity for the second energy source, in particular here for the fuel cell 33, provided by the associated cooling system 41. The memory of the control module 51 may thus be loaded with a single maximum operating power value $P_{max}$, it being understood that this value may vary from one vehicle to another depending on the size of the cooling system associated with the second energy source.

Moreover, and as will be explained below, the memory of the control module 51 may consist of a data table in which the maximum operating power $P_{max}$ is associated with a temperature, so as to take into account variable cooling performance depending on the temperature of the environment in which the cooling system 41 is immersed.

Figure 2:
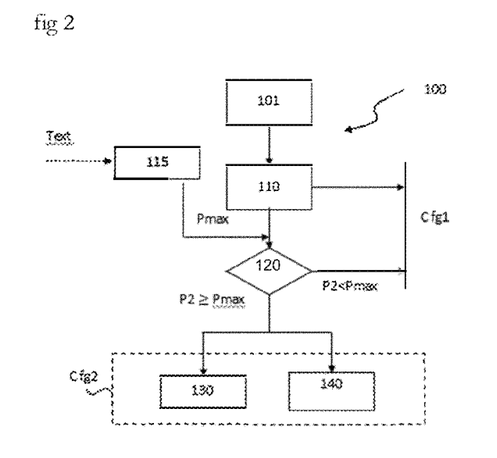
FIG. 2 is a flowchart showing the various steps of one embodiment of the method according to the invention.

As will be described below, in particular with reference to FIG. 2, this maximum operating power $P_{max}$ is specific to the invention in that the electric power supply device 6 is able to adopt multiple configurations for controlling the energy sources 7, 31 depending on whether or not this maximum electric power is exceeded by the initial operation of the fuel cell. More specifically, the electric power supply device 6 for an electric motor of a motor vehicle is configured to compare the value of the second electric power P2 with the value of the maximum operating power $P_{max}$ able to be supplied by the second energy source, and then, when the second electric power P2 exceeds the maximum operating power $P_{max}$ able to be supplied by the second energy source 31, to modify the controlling of the second source so as to reduce the value of the second electric power to a value substantially equal to that of the maximum operating power $P_{max}$, and finally accordingly modify the controlling of the first source so as to increase the first electric power P1 supplied by the first energy source 7.

As an alternative or in addition, the trigger threshold value may be the temperature. In the embodiment illustrated in FIG. 1, the electric power supply device 6 comprises a temperature sensor 52 and the control module 51 is configured to retrieve a temperature value $T_{ext}$ detected by this sensor. It should be noted that, without departing from the context of the invention, the control module could be configured to retrieve a temperature value from a temperature sensor also housed on board the vehicle for other purposes and not dedicated specifically to the electric power supply device.

In the example illustrated, the temperature sensor is configured to detect the temperature outside the vehicle, it being understood that the temperature detected by the sensor could be a temperature of the fuel cell or of another component of the second energy source.

The temperature value $T_{ext}$ detected by the temperature sensor 52 may in particular be used in the first application case, with the maximum power $P_{max}$ equal to a single value that is independent of the temperature. It will be understood that, when the detected temperature $T_{ext}$ is low, the thermal integration of the fuel cell system makes it possible to meet the cooling needs of the fuel cell system. Indeed, in this case, with the defined size of the heat exchanger forming part of the cooling system and arranged in particular on the front face of the vehicle, the high temperature difference between the operating temperature of the fuel cell system and the detected temperature enables effective cooling of the fuel cell system.

Conversely, when the outside temperature $T_{ext}$ is high, the thermal integration of the fuel cell system makes it possible to meet the cooling needs of the fuel cell system only partially. Indeed, in this case, with the defined size of the heat exchanger forming part of the cooling system and arranged in particular on the front face of the vehicle, the temperature difference between the operating temperature of the fuel cell system and the detected temperature $T_{ext}$ is small, and the cooling system installed in the vehicle no longer enables effective cooling of the fuel cell system. There is therefore a temperature threshold value $T_{max}$ at which the cooling circuit still makes it possible to cool the fuel cell system and beyond which the thermal power able to be evacuated by the cooling system is limited, and therefore the electric power generated by the fuel cell system must also be limited to the level of the maximum operating power $P_{max}$ able to be supplied by the second energy source $P2_{max}$.

In each of the cases mentioned above, and regardless of the threshold value under consideration, whether or not the temperature is taken into account, for example, the power supply device 6 is configured to allow a method for supplying an electric power that makes it possible, if necessary, to modify a first configuration Cfg1 for controlling the energy sources, if this involves challenging conditions for cooling the second energy source 31 and in particular the fuel cell 33 liable to be fitted to this second source.

One example of a method, according to a first embodiment, will now be described with reference to the flowchart illustrated in FIG. 2. The method is implemented, in the illustrated embodiment, by the control module 51 of the electric vehicle 1.

The method according to the first embodiment 100 may be initiated by a request for electric power 101 from the electric motor. This request may be sent in the direction of the control module 51, or else the control module is configured to go and retrieve operating data from the vehicle, for example an acceleration demand made by the driver, to generate this request.

This request is analyzed by the control module 51 so as to define, in a calculating step 110, a first control configuration Cfg1 in which operating instructions are generated for each of the energy sources 7, 31. As was described above, the sum of the values of the electric power P1, P2 generated by the operation of each energy source 7, 31 is equal to a target electric power P, that is to say an overall value of electric power intended to be supplied to the electric motor. In the example described here, this target electric power P is equal to 100% of the electric power supplied to the electric motor, without this limiting the invention, since the quantity of power supplied by the two energy sources remains constant when transitioning from one control configuration mode to the other.

At the same time as the generation of the control instructions for the energy sources 7, 31, or at the end of a given time period, without this limiting the invention, the supply method according to the invention comprises a phase of modifying the controlling of the energy sources.

In the first embodiment, the phase of modifying the controlling of the energy sources begins with a step 120 of comparing electric power, between the power demanded from the second energy source 31 in the first control configuration Cfg1 and the maximum operating power $P_{max}$.

To this end, in a data retrieval step 115, the control module 51 retrieves the maximum operating power value $P_{max}$ from the memory provided for this purpose and considers the electric power demanded from the second energy source 31 in the first control configuration Cfg1. In one variant of this first embodiment of the method, and as shown in dotted lines in FIG. 2, the datum retrieved as maximum operating power value $P_{max}$ may depend on the temperature, considering that the detected temperature $T_{ext}$ or the temperature released by the fuel cell system may impact the cooling function. In this variant, an ambient temperature $T_{ext}$, or a temperature of the environment close to the cooling system, may be retrieved by the control module 51 so as to retrieve, from the database, and in this case from a data table, a maximum power value adjusted to the detected temperature.

If the result of this comparison step 120 is such that the value of electric power P2 demanded from the second energy source in the first control configuration Cfg1 is lower than the value of the maximum operating power $P_{max}$, the power demanded from each of the energy sources, and in particular from the fuel cell forming the second energy source, remains unchanged and the first control configuration Cfg1 is retained.

Conversely, if the value of electric power P2 demanded from the second energy source in the first control configuration is greater than the value of the maximum operating power $P_{max}$, the control module 51 generates a modification of the control instructions for the energy sources 7, 31 so as to modify their contribution of electric power without penalizing the supply of power to the electric motor 3.

More specifically, the control module sends an instruction 130 to reduce the electric power demanded from the second energy source 31, such that this second electric power P2 is reduced to the level of the maximum operating power value $P_{max}$. This thus ensures that the cooling will be carried out correctly during operation of the fuel cell system and that it will be able to work correctly.

At the same time, the control module, in an adjustment step 140, sends an instruction to increase the electric power demanded from the first energy source so as to maintain the target electric power. The method thus provides a step of adjusting the electric power P1 demanded from the first energy source 7 on the basis of the modification that has been made to the electric power P2 demanded from the second energy source 31, in order to maintain the target electric power P.

In other words, the control module 51 modifies the control instructions given to the two energy sources such that they are controlled in a second control configuration Cfg2 different from the first control configuration Cfg1, but with a value of electric power delivered to the motor by the power supply device that remains unchanged, this value of electric power delivered to the motor by the power supply device being equal to the sum of the values of the first electric power P1, that is to say the electric power generated by the first electrical source 7 of the power supply device 6, and of the second electric power P2, that is to say the electric power generated by the second electrical source 31 of the power supply device 6.

Figure 3:
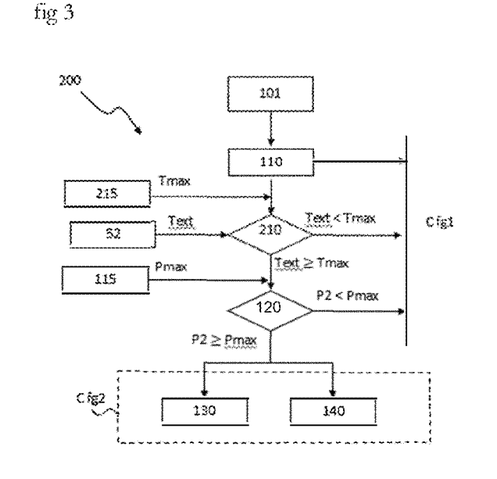
FIG. 3 is a flowchart similar to that of FIG. 2, illustrating the various steps of an alternative embodiment of the method according to the invention.

FIG. 3 illustrates a second embodiment of the method according to the invention, which differs from what has been described above in that the step of comparing the demanded electric power with the maximum operating power $P_{max}$ is initiated based on a temperature detected by a temperature sensor.

This second embodiment 200 thus comprises, after the step 110 of calculating the first control configuration in accordance with what has been described above, a step 210 of comparing the detected temperature $T_{ext}$ with a temperature threshold value $T_{max}$, the result of this step possibly leading to the first control configuration Cfg1 being maintained or to the starting of a phase of modifying the controlling of the sources in accordance with what has been described above so as to obtain a second control configuration Cfg2. In a manner similar to what has been mentioned above for the maximum operating power value, the temperature threshold value $T_{max}$ may be retrieved by the control module 51 from an appropriate memory, during a data retrieval step 215. In other words, the power comparison carried out by the control module 51 as was mentioned above remains the same, but is performed, in this second embodiment, only when the detected temperature $T_{ext}$ exceeds a temperature threshold value $T_{max}$.

To implement this second embodiment of the method 200, a temperature value should be able to be detected and the power supply device 6, to this end, may comprise a temperature sensor 52, it however being understood that the temperature value could also be retrieved from management electronics of the vehicle. The temperature under consideration here may in particular be the ambient temperature, outside the vehicle, or else be the temperature in the area of the substructure of the vehicle in which the fuel cell system is primarily arranged.

Given that the outside temperature $T_{ext}$, or the temperature of the environment close to the fuel cell system, is taken into account prior to the phase of modifying the controlling of the sources, the maximum operating power $P_{max}$, retrieved in the data retrieval step 115, is independent here of the detected temperature.

It should be understood from the description of this second embodiment of the supply method that it has a purpose similar to that of the first embodiment, with the obtaining of a second control configuration Cfg2, different from the first control configuration Cfg1, when a detected value is greater than an operating threshold value.

Figure 4:
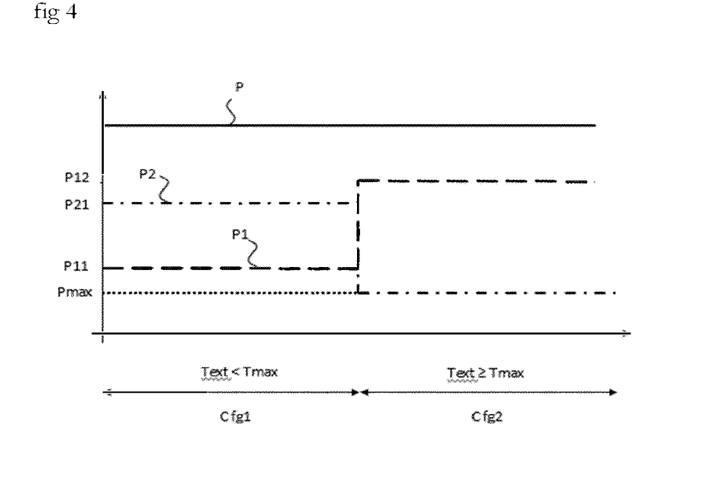
FIG. 4 is a diagram illustrating one feature of the invention according to which, at a given time, two electric power sources for an electric motor are controlled so as to modify the power that they respectively contribute while maintaining a constant target power.

FIG. 4 illustrates the transition from one control configuration to the other, in particular in the case where the method for supplying electric power takes into account the exceedance of a temperature threshold value so as to initiate the modification of the control configurations, to illustrate the fact that the sum of the values of electric power respectively supplied by the first and the second energy source remains the same in the first configuration and in the second configuration.

More specifically, in the first configuration Cfg1, here when the detected temperature $T_{ext}$ is lower than the threshold temperature Tmax, the first energy source is controlled so as to generate a first electric power P11 and the second energy source is controlled so as to generate a second electric power P21. The value of the first electric power P11 and the value of the second electric power P21 are such that their sum is equal to the value P of the electric power delivered by the power supply device 6 to the electric motor 3.

At the time of transitioning from one configuration to the other, here when the detected temperature $T_{ext}$ is equal to the threshold temperature value $T_{max}$, and because the electric power demanded from the second source in the first configuration is greater than the maximum operating power $P_{max}$, the second energy source is controlled so as to bring the generated electric power back to a value equal to the maximum operating power P. At the same time, the first energy source is controlled so as to generate a first electric power P12 of a value greater than that of the first electric power P11 of the first configuration, so as to compensate for the reduction in power generated by the second control configuration of the second energy source. In this case too, in this second configuration, the value of the first electric power P12 and the value of the second electric power, here equal to the maximum operating power $P_{max}$, are such that their sum is equal to the value P of the electric power delivered by the power supply device 6 to the electric motor 3.

The invention as has just been described achieves the aim that it set itself, and makes it possible to propose a method for supplying electrical energy to a motor of an electric vehicle, making it possible to optimize the operation of two energy sources that are able to supply electric power to an electric motor in parallel. In particular, this invention makes it possible to extend the range of a motor vehicle without penalizing the electric power that needs to be delivered to the electric motor so that the latter is able to provide the performance desired by the driver of the vehicle, and without risking creating a malfunction of the additional energy source forming a range extender. Of course, the invention is not limited to the examples that have just been described and many modifications may be made to these examples without departing from the scope of the invention.

The invention claimed is:

1. An electric power supply device, comprising
a first energy source;
a second energy source; and
a control module configured to control the first energy source to supply a first electric power to an electric motor of a motor vehicle and to control the second energy source to supply a second electric power to the electric motor,
wherein the control module comprises a memory module configured to store a value of a maximum operating power able to be supplied by the second energy source, the maximum operating power value being dependent on a cooling capacity for the second energy source, and
wherein the control module is configured to:
compare a value of the second electric power with the value of the maximum operating power able to be supplied by the second energy source,
modify, when the value of the second electric power exceeds the value of the maximum operating power able to be supplied by the second energy source, the control of the second energy source to reduce the value of the second electric power to a value equal to the value of the maximum operating power able to be supplied by the second energy source, and
modify the control of the first energy source so as to increase the first electric power supplied by the first energy source.

2. The electric power supply device as claimed in claim 1, wherein a sum of values of the first electric power and of the second electric power is equal to a target electric power to be supplied to the electric motor.

3. The electric power supply device as claimed in claim 1, wherein the first energy source comprises at least one electric battery and/or wherein the second energy source comprises at least one fuel cell.

4. The electric power supply device as claimed in claim 1, further comprising at least one temperature sensor configured to detect a temperature,
wherein the control module is configured to compare the temperature detected by the at least one temperature sensor with a temperature threshold value, the electric power supply device being configured to modify the control of the first and second energy sources when the temperature detected by the at least one temperature sensor exceeds the temperature threshold value.

5. A method for supplying an electric power demanded by the electric power supply device for an electric motor as claimed in claim 4, the method comprising:

comparing the temperature detected by the at least one temperature sensor with the temperature threshold value;
comparing the second electric power demanded from the second energy source and the maximum operating power able to be supplied by the second energy source, when the temperature detected by the at least one temperature sensor is greater than the temperature threshold value; and
reducing the second electric power demanded from the second energy source to a value equal to the maximum operating power able to be supplied by the second energy source, when the second electric power demanded from the second energy source exceeds the maximum operating power able to be supplied by the second energy source.

6. The method as claimed in claim 5, further comprising adjusting the electric power demanded from the first energy source, such that a sum of the first electric power demanded from the first energy source and of the second electric power demanded from the second energy source remains equal to a target electric power to be supplied to the electric motor of the vehicle.

7. The method as claimed in claim 5, during which the second electric power demanded from the second energy source remains unchanged when the electric power demanded from the second energy source is less than the maximum operating power able to be supplied by the second energy source and/or when the temperature detected by the at least one temperature sensor is lower than the temperature threshold value.

8. The electric power supply device as claimed in claim 1, further comprising at least one temperature sensor configured to detect a temperature,
wherein the value of the maximum operating power able to be supplied by the second energy source is variable based on the temperature detected by the at least one temperature sensor.

9. The motor vehicle comprising:
the electric motor; and
the electric power supply device as claimed in claim 1.

10. The electric power supply device as claimed in claim 1, further comprising at least one temperature sensor configured to detect a temperature,
wherein the control module is configured to compare the value of the second electric power with the value of the maximum operating power able to be supplied by the second energy source only when the temperature detected by the at least one temperature sensor is greater than a temperature threshold value.

* * * * *